United States Patent [19]
Gale

[11] 3,996,831
[45] * Dec. 14, 1976

[54] METAL SHEARING MACHINE

[76] Inventor: Wilfred Ernest Gale, 5, Stream Park, East Grinstead, Sussex, England

[*] Notice: The portion of the term of this patent subsequent to Dec. 3, 1991, has been disclaimed.

[22] Filed: Apr. 24, 1974

[21] Appl. No.: 463,554

Related U.S. Application Data

[63] Continuation-in-part of Ser. No. 396,188, Sept. 11, 1973, Pat. No. 3,851,553.

[30] Foreign Application Priority Data

May 7, 1973 United Kingdom ............ 21635/73

[52] U.S. Cl. ................................. 83/589; 83/604; 83/601; 83/859
[51] Int. Cl.² ........................................ B26D 5/18
[58] Field of Search ............ 83/597, 600, 601, 602, 83/603, 604, 605, 606, 529, 589, 859

[56] References Cited
UNITED STATES PATENTS

| | | | |
|---|---|---|---|
| 166,844 | 8/1875 | Broadbook | 83/603 |
| 430,264 | 6/1890 | Bertsch | 83/597 |
| 441,532 | 11/1890 | Bruce | 83/601 |
| 3,851,553 | 12/1974 | Gale | 83/529 |

*Primary Examiner*—Donald R. Schran
*Attorney, Agent, or Firm*—William A. Drucker

[57] ABSTRACT

A metal shearing or punching machine has a body with upper and lower jaws defining a throat, the lower jaw carrying a die and the upper jaw carrying means for applying force to a blade movable in the throat to co-act with the die. The blade is pivotably mounted with respect to the body and the position of the pivoting axis on the body is selected to substantially eliminate detrimental misalignment of the blade and die when application of working force causes deformation of the body. For a given force to be applied between the blade and die the body can accordingly be made of relatively lighter construction than conventional castings used hitherto. Lateral stability of the blade is further enhanced by use of a relatively long bearing for the blade mount, e.g. substantially the entire width of the body adjacent to the pivot. In a preferred embodiment, the body of the machine is composed substantially wholly of two profile-cut steel plates connected by ties.

3 Claims, 2 Drawing Figures

METAL SHEARING MACHINE

This application is a continuation-in-part of Ser. No. 396,188, Sept. 11, 1973, my U.S. Pat. No. 3,851,553 issued Dec. 3, 1974.

This invention relates to machines for shearing sheet metal, and especially for punching holes therein.

The invention is concerned with such machines which are of the kind including a blade which co-acts with an apertured die. To obtain a clean shearing action, the cross-section of the blade in a plane parallel to the cutting face of the die must conform very closely to the cross-section of the aperture in the die. In other words, there must desirably be only a very small clearance between the outer side faces of the blade and the inner faces of the die aperture.

In order to present adequate free space, laterally about the blade and die, to permit a hole to be punched well inboard of the edges of a large workpiece, the supporting structure of the machine must have a suitably deep "throat".

The force required to push the blade through sheet metal may be of a high order, depending upon the composition, grade, and thickness of the sheet metal. Where there is a large lateral extent of the supporting structure, between the point where the blade and die are situated and the point where the die mount and the blade mount are united or coupled in the machine structure, the exertion of a high stress, as between the die mount and the blade mount, may result in resilient deformation of the structure of the machine, and such deformation may in turn result in misalignment of the blade and the die aperture. This can lead to damage of the blade and/or the die, and the risk of damage can only be lessened by either (i) making the supporting structure extremely rugged, for example as a heavy C-shaped metal casting, or (ii) limiting to an undesirable extent the cutting forces to be exerted in the machine, or (iii) risking reduction of the cleanness of cut by providing a detrimentally large rest clearance of the blade and die, so that small deformations and misalignments do not cause the blade to foul the die.

The object of the present invention is to provide an improved shearing or punching machine in which the disadvantages mentioned in the preceding paragraph are avoided, such that the machine may have a deep throat and be of relatively light construction, e.g. welded sheet metal as distinct from castings, whilst permitting heavy cuts with a close-tolerance blade and die which remain always in adequate alignment.

With a generally C-shaped structure it is found in practice that the application of force to the free ends of the jaws, in the direction tending to force them apart, causes resilient deformation of the structure in such a way that there is a flexing movement upwards of the upper jaw and a flexing movement downwards of the lower jaw, i.e. the inner edge of each jaw elongates. Further, a considerably smaller degree of deformation occurs in the bridging portion and in zones of each jaw adjacent to the bridging portion. In the bridging portion, or in an adjacent zone of the lower jaw if the lower jaw is sufficiently more rugged than the upper jaw, there is a notional axis on one side of which there is compression of the body material remote from the throat, and on the other side of which there is stretching of the body material adjacent to the throat. If the pivot axis of the blade arm is located at, or near that notional point, the only significant movement of the die relative to the blade, when heavy operating pressure is applied, is that resulting from elongation of the upper edge of the lower jaw due to flexing downwards of that jaw, and in practice this elongation is very small, say 1% to 5% compared with the relative movement apart of the free ends of the jaws. In other words, for a relatively major extent of deformation of the body as a whole, the die moves only a relatively very small amount, with respect to the blade arm pivot, and then only in a plane substantially parallel to the major side faces of the blade.

The present invention utilizes this phenomenon and according thereto a shearing or punching machine comprises a body having first and second elongate portions which are joined at one end by a bridging portion and which are spaced apart for the remainder of their length so as to define an open-ended throat, a die carried by said first body portion at a position adjacent to the open end of the throat, a blade positioned in the throat, blade driving means mounted on said second body portion and coupled to said blade so as to permit exertion of force between said second body portion and said blade for driving the blade in a working stroke in which the blade coacts with the die, and supporting means for said blade pivotably mounted on said bridging portion or on an adjacent zone of said first body portion, whereby resilient deformation of said body within the working limits of the machine, as a result of application of blade driving force, results in only negligible misalignment of the blade and die.

The supporting means for the blade may be a radius arm pivoted to the body at one end and carrying the blade at the other end. The point of pivoting is situated generally in the bridging portion of the body, lying between the first and second portions, or in an adjacent zone of the first portion.

Although it would not matter, in a machine having an extremely long throat, if the pivot point of the blade arm was located even slightly above the plane of the die face, it is preferable to have the pivot point not above that plane, and for any machine having a throat of length suitable for workshop use, it is best to have the pivot point below the plane of the die face, to ensure that the blade is always able to pass through the die aperture.

Accordingly, in order to facilitate entry of the blade, with very small clearance, into the die, the point of pivoting of the blade supporting means is preferably disposed, considered in the direction of the working stroke of the blade, beyond the plane of the surface of the die.

To facilitate retention of alignment of the blade with the die, the blade supporting means advantageously includes a pivot bearing the length of which is substantially equal to the width of the body.

In a convenient construction the body comprises two substantially C-shaped plates disposed with the jaw portions of the respective plates converging towards each other, the die being mounted on one jaw of each plate, and a blade driving lever system being mounted on the other jaw of each plate. The blade supporting means is a radius arm which is isosceles triangular in plan, the base being pivoted to the body, and the apex carrying the blade.

An embodiment of sheet metal punch incorporating the principles of the invention is hereinafter particularly described with reference to the accompanying drawings, wherein.

Figure 1:
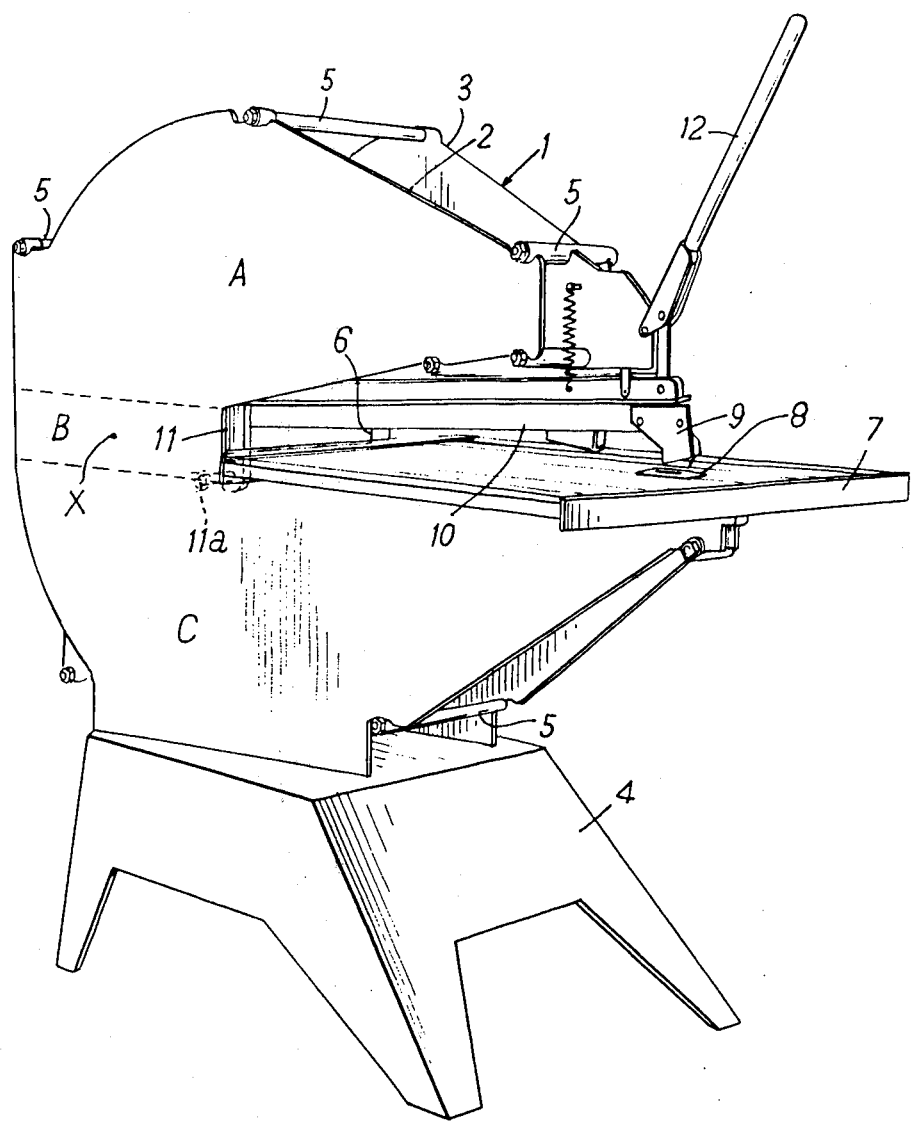
FIG. 1 is a perspective elevation of the machine.

Referring to FIG. 1, the machine has a static body structure 1 composed of sheet steel plates 2, 3 mounted on a base 4 and coupled by ties 5. The plates 2, 3 are of C-shape so as to have a throat 6 defined between upper, bridging, and lower portions A, B, C, respectively of the body.

Figure 2:
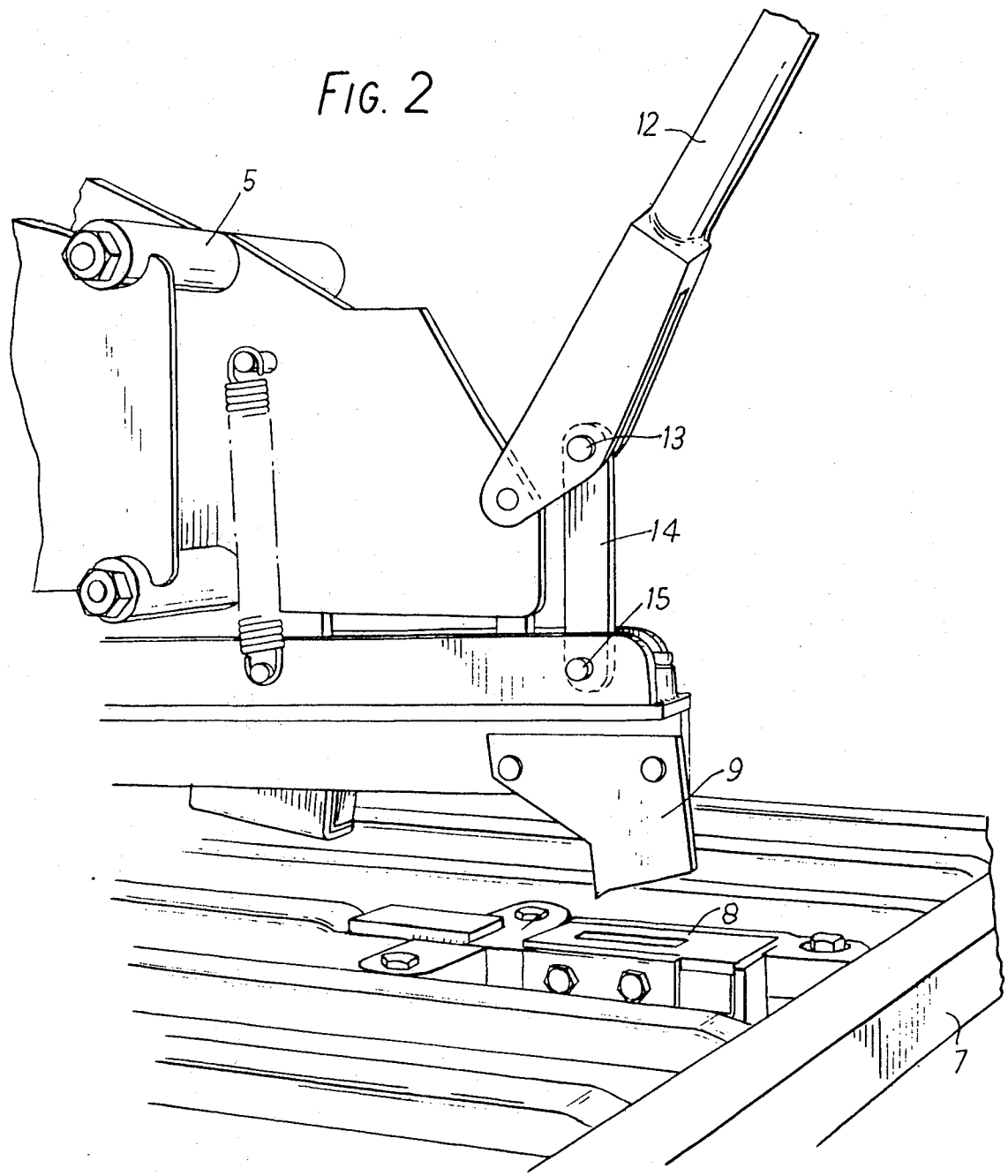
FIG. 2 is a perspective elevation, to a larger scale, of the blade, die and lever mechanism.

At the front of the body, and supported on the lower part, there is provided a work table 7 which includes a die plate 8 seen best in FIG. 2. The die plate has a rectangular opening to receive a correspondingly-sectioned vertical blade 9 mounted at the apex end of a triangular lever arm 10. The base of the arm has an elongated ball bearing pivot mounting supported by brackets 11 positioned at the closed end of the throat 6.

At the front end of the upper part of the body there is mounted a simple lever system which is best seen in FIG. 2. A long handle 12, for manual operation, is pivoted to the body and is connected by a pivot 13 to a link 14 coupled by a pin 15 to the front end to the blade arm 10.

The shaping and manner of pivoting of the blade arm 10 serves to keep it very closely aligned with the aperture of the die plate 8. If heavy pressure has to be applied to the handle 12, e.g. for the cutting of tough and/or thick sheet metal, there may be slight resilient deformation of the body. Such deformation as may occur in the body will result only in movement of the die, in relation to the blade, in a plane parallel to the major side faces of the blade, and the extent of such movement of the die will be very small, say between 1% and 5%, of the movement apart of the free ends of the upper and lower portions. Thus, the blade will tend to remain fully aligned with the die so far as the major side faces are concerned, and only slightly shifted relative to the die so far as the shorter end faces are concerned, and to an extent which is acceptable in practical operation of such a machine. To reduce deformation of the lower portion C still further, it may be reinforced by, for example, struts welded to each sheet metal plate 2, 3 along the lower jaw.

The pivot axis 11a of the blade arm 10 is situated just in the lower body portion C, very close to a notional stationary axis "X" situated in the bridging portion B.

I claim:

1. A metal shearing machine comprising:
   i. a body composed of two substantially C-shaped plates each including an elongate lower jaw, an elongate upper jaw, and a bridging portion, said lower and upper jaws being joined at one end by said bridging portion and being spaced apart for the remainder of their length so as to define a throat which is open at its end remote from said bridging portion, said plates being disposed in spaced relationship with the jaw areas of the respective plates converging towards each other towards their free end;
   ii. a die carried by the lower jaws of the plates at a position adjacent to the open end of the throat;
   iii. a blade-driving lever system mounted on the upper jaws of the plates and coupled to said blade for the application of force between said upper jaws and said blade for driving the blade in a working stroke in which the blade co-acts with said die;
   v. supporting means for said blade pivotably mounted selectively on said bridging portion and on an adjacent zone of said lower jaws whereby resilient deformation of said body within the working limits of the machine, as a result of application of blade driving force, results in only negligible misalignment of the blade and die.

2. A metal shearing machine comprising:
   i. a body including a first elongate portion, a second elongate portion, and a bridging portion, said first and second elongate portions being joined at one end by said bridging portion and being spaced apart for the remainder of their length so as to define a throat which is open at its end remote from said bridging portion;
   ii. a die carried by said first body portion at a position adjacent to the open end of the throat;
   iii. a blade positioned in the throat;
   iv. blade-driving means mounted on said second body portion and coupled to said blade for the application of force between said second body portion and said blade for driving the blade in a working stroke in which the blade co-acts with said die;
   v. supporting means for said blade pivotably mounted selectively on said bridging portion and on an adjacent zone of said first body portion, said blade supporting means being a radius arm which, considered in a plane including its axis of pivoting, is of isosceles triangular shape, the bearing axis being positioned at the base of the triangle, the blade being mounted at the apex of said triangle, whereby resilient deformation of said body within the working limits of the machine, as a result of application of blade driving force, results in only negligible misalignment of the blade and die.

3. A metal shearing machine, as claimed in claim 1, wherein said blade supporting means is a radius arm having first and second ends, said radius arm being pivoted by its first end to said body, said radius arm carrying said blade at its second end, the axis of pivoting of said first end of said radius arm to the body being disposed, considered in the direction of the working stroke of the blade as it coacts with the die, beyond the plane of the surface of the die, said radius arm when considered in a plane including its axis of pivoting being of isosceles triangular shape, the bearing axis being positioned at the base of the triangle and the blade being mounted at the apex of the triangle.

* * * * *